US011601301B2

(12) United States Patent
Stegemann et al.

(10) Patent No.: US 11,601,301 B2
(45) Date of Patent: Mar. 7, 2023

(54) TRANSCEIVER DEVICE FOR A BUS SYSTEM AND METHOD FOR REDUCING CONDUCTED EMISSIONS

(71) Applicant: Robert Bosch GmbH, Stuttgart (DE)

(72) Inventors: Sebastian Stegemann, Tuebingen (DE); Steffen Walker, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 267 days.

(21) Appl. No.: 16/976,673

(22) PCT Filed: Mar. 5, 2019

(86) PCT No.: PCT/EP2019/055361
§ 371 (c)(1),
(2) Date: Aug. 28, 2020

(87) PCT Pub. No.: WO2019/174956
PCT Pub. Date: Sep. 19, 2019

(65) Prior Publication Data
US 2020/0412573 A1 Dec. 31, 2020

(30) Foreign Application Priority Data
Mar. 12, 2018 (DE) .................. 102018203671.3

(51) Int. Cl.
*H04L 12/40* (2006.01)
*H04L 25/03* (2006.01)
*H04L 25/08* (2006.01)

(52) U.S. Cl.
CPC .. *H04L 12/40032* (2013.01); *H04L 12/40078* (2013.01); *H04L 12/40123* (2013.01);
(Continued)

(58) Field of Classification Search
CPC ......... H04L 12/40032; H04L 12/40078; H04L 12/40123; H04L 25/0328; H04L 25/08
See application file for complete search history.

(56) References Cited

U.S. PATENT DOCUMENTS 5,323,072 A * 6/1994 Fisch .................. H03K 17/163
327/170
5,467,455 A 11/1995 Gay et al.
(Continued)

FOREIGN PATENT DOCUMENTS

CN     105684369 A    6/2016
CN     105684370 A    6/2016
(Continued)

OTHER PUBLICATIONS

International Search Report for PCT/EP2019/055361, dated May 21, 2019.

*Primary Examiner* — Ricky Q Ngo
*Assistant Examiner* — Stephen N Steiner
(74) *Attorney, Agent, or Firm* — Norton Rose Fulbright US LLP; Gerard Messina

(57) ABSTRACT

A transceiver device for a bus system and a method for reducing conducted emissions. The transceiver device has a transmitting stage for transmitting a transmit signal to a first bus wire of a bus of the bus system, in which bus system an exclusive, collision-free access of a user station to the bus of the bus system is at least temporarily ensured, and for transmitting the transmit signal to a second bus wire of the bus, a receiving stage for receiving the bus signal transmitted on the bus wires, and an emission reduction unit for controlling a switch-on path of a first stand-off device in the transmitting stage as a function of whether or not a dominant stage of the transmit signal occurs.

16 Claims, 5 Drawing Sheets

(52) U.S. Cl.
 CPC .......... *H04L 25/0328* (2013.01); *H04L 25/08* (2013.01); *H04L 2012/40215* (2013.01)

(56) References Cited

U.S. PATENT DOCUMENTS

2005/0135331 A1* 6/2005 Reindl .............. H04L 12/40032
 370/351
2017/0063571 A1* 3/2017 Hehemann ............ H04L 12/413

FOREIGN PATENT DOCUMENTS

| | | |
|---|---|---|
| CN | 105759752 A | 7/2016 |
| CN | 106464558 A | 2/2017 |
| DE | 102014204048 A1 | 9/2015 |
| DE | 102016100176 A1 | 7/2016 |
| EP | 0533971 A1 | 3/1993 |
| WO | 2010041212 A2 | 4/2010 |

\* cited by examiner

TRANSCEIVER DEVICE FOR A BUS SYSTEM AND METHOD FOR REDUCING CONDUCTED EMISSIONS

The present invention relates to a transceiver device for a bus system and to a method for reducing conducted emissions. The bus system is, in particular, a CAN bus system and/or a CAN FD bus system. The transceiver device is usable, in particular, in a CAN bus system or a CAN FD bus system, and uses connected stand-off devices in the transmitting state, more precisely, in its transmitting block, in order to effectuate a reduction of conducted emissions.

BACKGROUND INFORMATION

In a CAN bus system, messages are transmitted with the aid of the CAN protocol and/or the CAN FD protocol. The CAN bus system is used, in particular, in the communication between sensors and control units in a vehicle or in a technical production facility, etc. In a CAN FD bus system, a data transmission rate of greater than 1 Mbit per second (1 Mbps) is possible, for example, of 2 Mbit/s, 5 Mbit/s, or an arbitrary other data transmission rate of greater than 1 Mbit/s etc. A CAN HS bus system (HS=high speed) is also available, in which a data transmission rate of up to 500 kbit per second (500 kpbs) is possible.

For the data transmission in a CAN bus system, the present CAN Physical Layer ISO11898-2:2016 as CAN protocol specification with CAN FD requires the adherence to predetermined parameters. In addition to the adherence to functional parameters, the emission, interference resistance (direct pin injection—DPI) and the protection against electrostatic discharge (ESD) are also taken into consideration.

The problem is that in the case of CAN FD at 2 Mbit/s and 5 Mbit/s, the bit rate is increased by 4 to 10 times compared to the classic CAN at 500 kbit/s, although it is specified to also adhere to the same emission limits in the case of CAN FD as in the case of CAN. This represents an enormous challenge in fulfilling the requirements for adhering to the parameters for the conducted emission.

The conducted emission of CAN transceivers or CAN FD transceivers or CAN or CAN FD transmitting/receiving devices is measured according to the 150 Ohm method (IEC 61967-4, Integrated circuits, Measurement of electromagnetic emissions—150 kHz to 1 GHz—Part 4: Measurement of conducted emissions—1/150 direct coupling method) and according to IEC 62228 (EMC evaluation of CAN Transceivers). In the emission measurement, a divided alternating voltage signal on the two bus lines (CAN_H and CAN-L) is evaluated.

In the document "IEC TS 62228 Integrated circuits—EMC evaluation of CAN transceivers," the structure in the EMV measurement is codified. Accordingly, three transceiver devices are operated at the same CAN bus with a shared 60 ohm terminal resistor and a decoupling network. One of the transceiver devices transmits a transmit signal, the other transceiver devices are in the same operating mode, but transmit no dominant bit or no dominant signal state, so that the transmit signals of these other transceiver devices are high=recessive.

The technical challenge is not to exceed the required limiting values in the case of conducted emission (according to IEC62228).

SUMMARY

It is an object of the present invention to provide a transceiver device for a CAN bus system and a method for reducing conducted emissions, which solve the aforementioned problems.

The object may achieved by a transceiver device for a CAN bus system in accordance with example embodiments of the present invention. In an example embodiment of the present invention, the transceiver device includes a transmitting stage for transmitting a transmit signal to a first bus wire of a bus of the bus system, in which bus system an exclusive collision-free access of a user station to the bus of the bus system is at least temporarily ensured, and for transmitting the transmit signal to a second bus wire of the bus, a receiving stage for receiving the bus signal transmitted on the bus wires, and an emission reduction unit for controlling a switch-on path of a first stand-off device in the transmitting stage as a function of whether or not a dominant state of the transmit signal occurs.

With the transceiver device according to the example embodiment of the present invention, the emission, in particular, of interference radiation, is enormously reduced, in particular, by several dBµV. As a result, the conducted emission is reduced and the electromagnetic compatibility (EMV) of the transceiver device is improved. The present invention aids in reducing the emission of the transceiver device at CAN FD bit rates and provides a significant contribution on the way to adhering to the limiting values.

An increase in the symmetry of the two bus wires with respect to the impedance may also be achieved.

As a further advantageous effect, the described transceiver brings no additional capacity to the bus wires of a bus line for the bus. Instead, the transceiver device even reduces the capacity with regard to small signals.

The effect of the transceiver device is particularly advantageous when using a common mode choke, which usually has an inductivity value of 100 µH, since in the case of the common mode choke with a conventional transceiver device particularly excessive emission levels occur.

Advantageous additional embodiments of the transceiver device of the present invention are described herein.

The emission reduction unit is designed, in particular, for controlling the effective resistance to ground for the switch-on path of the P-channel stand-off device.

In one example embodiment of the present invention, the transmitting stage has a first transmitting block for transmitting the transmit signal to the first bus wire and a second transmitting block for transmitting the transmit signal to the second bus wire, the first stand-off device being connected into the first transmitting block.

It is possible that the first stand-off device is a P-channel stand-off transistor, the emission reduction unit being designed to control the gate of the P-channel stand-off transistor.

It is also possible to provide a second stand-off device in the second transmitting block, which is smaller than the first stand-off device provided in the first transmitting block. In this case, the second stand-off device is possibly an N-channel stand-off transistor.

According to one specific embodiment of the present invention, the emission reduction unit has a logic block for evaluating the transmit signal and a signal received by the bus, a resistor, which is connected at one end to a gate of the stand-off device and at its other end to ground, and a switch for switching the gate of the stand-off device as a function of the evaluation result of the logic block in such a way that the gate of the stand-off device is either pulled at low impedance to ground with the aid of the switch or is pulled at high impedance to ground via the resistor.

In this case, the logic block may be designed to activate the switch, to pull the switch-on path of the stand-off device at low impedance to ground if a dominant state of the transmit signal occurs, the logic block being designed to activate the switch to pull the switch-on path of the stand-off device at high impedance to ground if a recessive state of the transmit signal occurs, and the transceiver device is operated for a receiving but not a transmitting user station.

The switch in this case may be a transistor, which has a lower-impedance resistance value than the resistor, and the output of the logic block being connected to the gate of the transistor.

The transceiver is possibly a CAN FD transceiver device.

The above-described transceiver device may be part of a bus system, which includes a bus and at least two user stations interconnected via the bus in such a way that they are able to communicate with each other. In this case, at least one of the at least two user stations includes a transceiver device as described above.

The aforementioned object is also achieved by a method for reducing conducted emissions in accordance with an example embodiment of the present invention. The method is carried out using a transceiver device for a bus system in which an exclusive, collision-free access of a user station to a bus of the bus system is at least temporarily ensured. The transceiver device in this case includes a transmitting stage, a receiving stage and an emission reduction unit, the method including the steps: transmitting, using the transmitting stage, a transmit signal to a first bus wire of the bus, transmitting the transmit signal to a second bus wire of the bus, receiving, using the receiving stage, the bus signal transmitted on the bus wires and controlling, using the emission reduction unit, a switch-on path of a first stand-off device in the transmitting stage as a function of whether or not a dominant state of the transmit signal occurs.

The example method offers the same advantages as described above with reference to the example transceiver device.

Further potential implementations of the present invention also include combinations not explicitly cited of features or specific embodiments described above or in the following with reference to the exemplary embodiments. Those skilled in the art will also add individual aspects as improvements on or additions to the respective basic form of the present invention, based on the disclosure herein.

BRIEF DESCRIPTION OF THE DRAWINGS

The present invention is described in greater detail below with reference to the figures and based on exemplary embodiments.

In the figures identical or functionally identical elements are provided with the same reference numerals, unless otherwise indicated.

DETAILED DESCRIPTION OF EXAMPLE EMBODIMENTS

Figure 1:
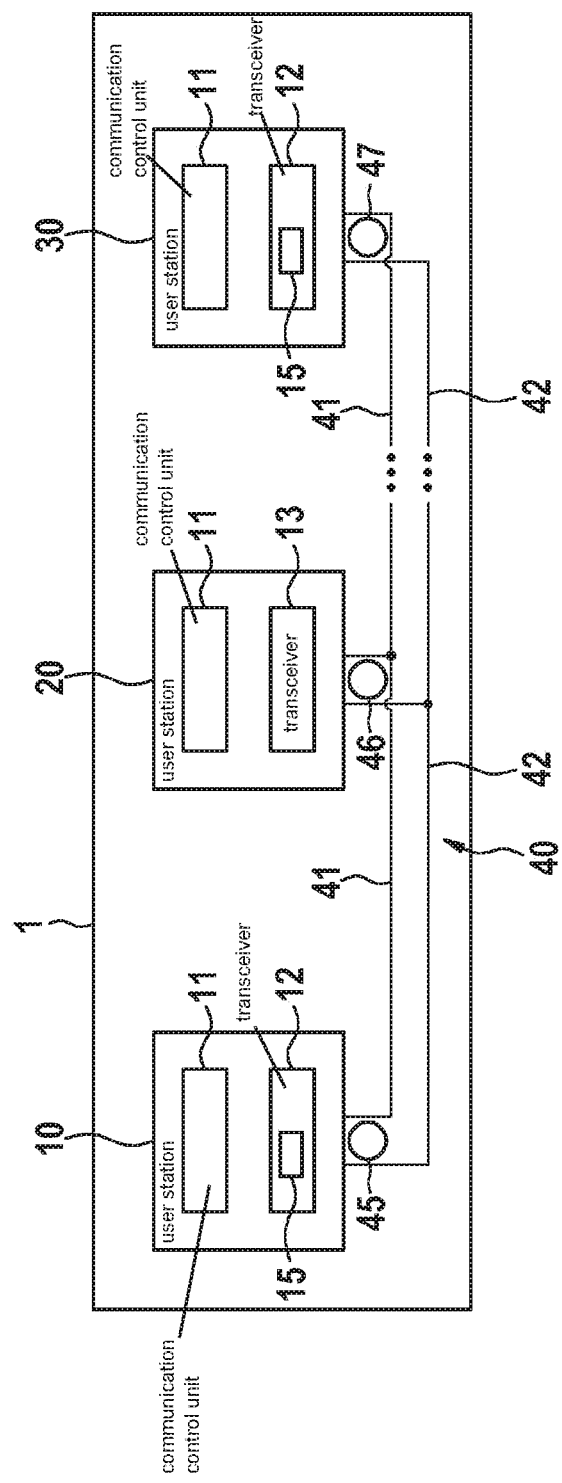
FIG. 1 shows a simplified block diagram of a bus system according to one first exemplary embodiment of the present invention.

FIG. 1 shows a bus system 1, which may, for example, be at least in sections, a CAN bus system, a CAN FD bus system, etc. In general, bus system 1 is a serial bus system in which a bus state, in particular, the dominant level of a transmit signal, is actively driven. Bus system 1 may be used in a vehicle, in particular, in a motor vehicle, an aircraft, etc. or in a hospital, etc.

Bus system 1 in FIG. 1 has a multitude of user stations 10, 20, 30, each of which is connected to a bus 40 with a first bus wire 41 and a second bus wire 42. Bus wires 41, 42 are used in a CAN bus system for signals for CAN_H and CAN_L and serve to couple-in the dominant level in the transmitting state. Messages 45, 46, 47 in the form of the aforementioned signals are transmittable via bus 40 between individual user stations 10, 20, 30. User stations 10, 20, 30 may, for example, be control units or display devices of a motor vehicle.

As shown in FIG. 1, user stations 10, 30 each have a communication control unit 11 and a transceiver device 12. Transceiver devices 12 each include an emission reduction unit 15. User station 20 on the other hand has a communication control unit 11 and a transceiver device 13. Transceiver devices 12 of user stations 10, 30 and transceiver device 13 of user station 20 are each directly connected to bus 40, even though this is not depicted in FIG. 1.

Communication control unit 11 serves to control a communication of respective user stations 10, 20, 30 via bus 40 with another user station of user stations 10, 20, 30 connected to bus 40. Transceiver device 12 serves to transmit and receive messages 45, 47 in the form of signals and utilizes in the process emission reduction unit 15, as described below in greater detail. Communication control unit 11 may be designed, in particular, as a conventional CAN FD controller and/or a CAN controller. Transceiver device 12 may otherwise be designed, in particular, as a conventional CAN-transceiver and/or a CAN FD transceiver. Transceiver device 13 serves to transmit and receive messages 46 in the form of signals. Transceiver device 13 may otherwise be designed as a conventional CAN transceiver.

Figure 2:
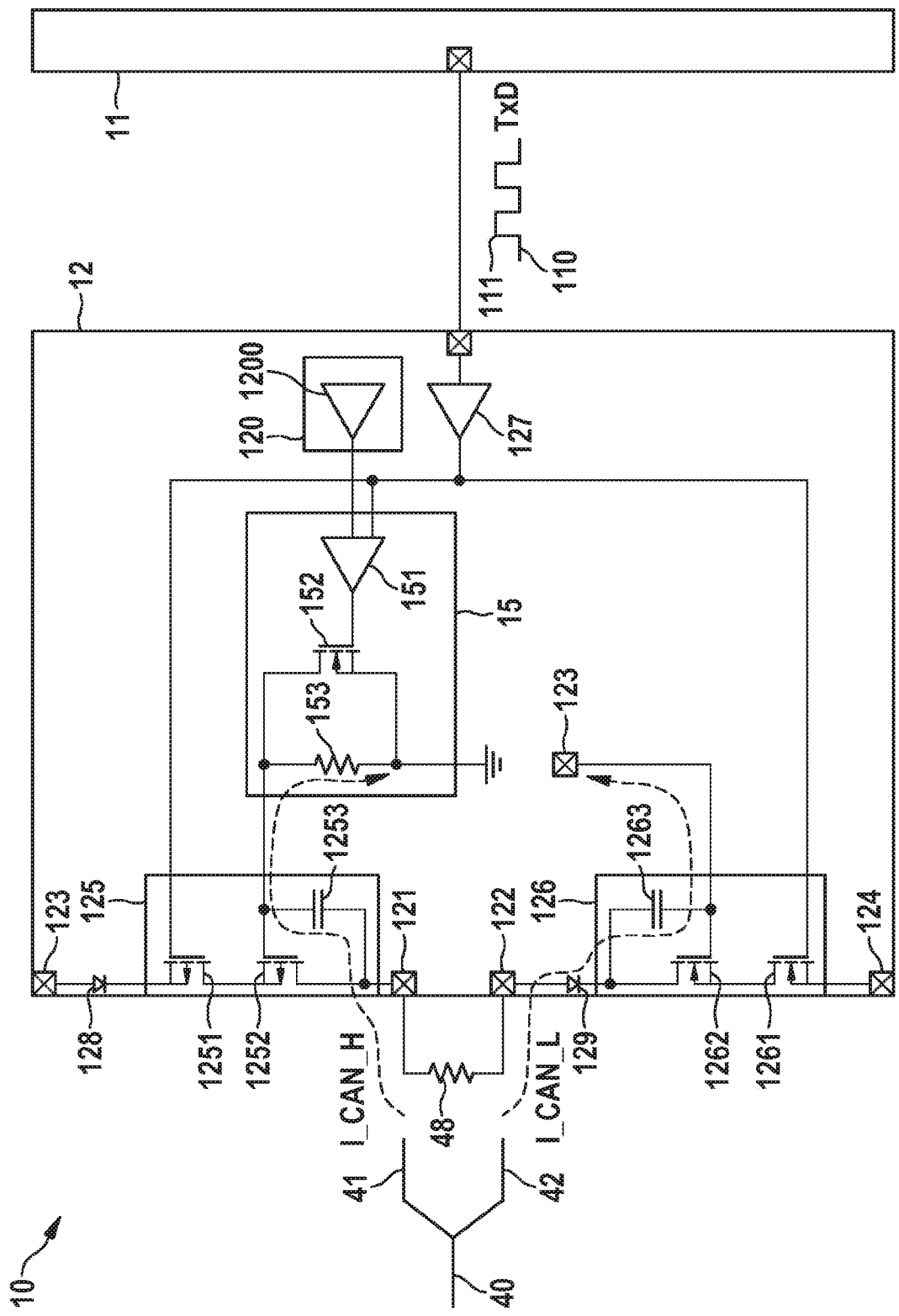
FIG. 2 shows a circuit diagram of a transmitting stage of a transceiver device in the bus system according to the first exemplary embodiment.

FIG. 2 shows the basic structure of transceiver device 12 including emission reduction unit 15. Transceiver device 12 is connected at terminals 121, 122 to bus 40, more precisely, at its first bus wire 41 for CAN_H and its second bus wire 42 for CAN_L. A differential bus signal VDIFF=CAN_H−CAN_L is set on bus 40 due to bus signals CAN_H, CAN_L. Bus wires 41, 42 are terminated at their end with a terminal resistor 48, as indicated only very schematically in FIG. 2. The voltage supply, in particular, the CAN supply, takes place at transceiver device 12 for the first and second bus wires 41, 42 via at least one terminal 123. The connection of transceiver device 12 to ground or to CAN_GND is implemented via a terminal 124.

First and second bus wires 41, 42 in transceiver device 12 are connected to a transmitting stage, which is also referred to as a transmitter and includes transmitting blocks 125, 126. Even though this is not depicted in detail in FIG. 2, first and second bus wires 41, 42 in transceiver device 12 are also connected to a receiving stage 120, which is also referred to as a receiver. Only the elements of the transmitting stage are depicted more precisely in FIG. 2, whereas receiving stage 120 with its receiving comparator 1200 is depicted only very schematically, since its exact structure is conventional and is not required for explaining the present exemplary embodiment.

A driver circuit 127 for driving a transmit signal TxD, which is generated by communication control unit 11 and output to transceiver device 12, is connected to transmitting blocks 125, 126 and thus to the transmitting stage. Transmit signal TxD is also referred to as a TxD signal. Transmit signal TxD may have different voltage states, in particular, a recessive state 110 or a dominant state 111, depending on the information to be conveyed.

According to FIG. 2, the transmitting stage has a first transmitting block 125 for signal CAN_H for first bus wire 41 and a second transmitting block 126 for signal CAN_L for second bus wire 42. The transmitting stage also has a reverse polarity protection diode 128 between terminal 123 for the voltage supply and first transmitting block 125. A reverse polarity protection diode 129 is connected between terminal 122 for second bus wire 42 and second transmitting block 126.

First transmitting block 125 has a low-voltage PMOS transistor 1251 (PMOS=P-conductive metal-oxide semiconductor) and a P-channel high-voltage stand-off transistor 1252, which are connected in series. A parasitic capacitance 1253 is formed between gate and drain of P-channel high voltage stand-off transistor 1252. Capacitance 1253 is also referred to as gate-drain capacitance of P-channel high-voltage stand-off transistor 1252. Thus, capacitance 1253 forms between the gate of transistor 1252 and terminal 121 for first bus wire 41.

Second transmitting block 126 has a low-voltage NMOS transistor 1261 (NMOS=N-conductive metal-oxide semiconductor) and an N-channel high-voltage stand-off transistor 1262, which are connected in series. A parasitic capacitance 1263 forms between gate and drain of N-channel high-voltage stand-off transistor 1252. Capacitance 1263 is also referred to as gate-drain capacitance of N-channel high-voltage stand-off transistor 1262.

Thus, capacitance 1263 forms between the gate of transistor 1262 and the cathode of reverse polarity protection diode 129, which is provided for terminal 122 for second bus wire 41.

If one of user stations 20, 30 transmits a transmit signal TxD to bus 40, the dynamic of the signals from transmitting user stations 20, 30 causes currents I_CAN_H, I_CAN_L into bus terminals 121, 122 of receiving transceiver 12 of user station 10. In the process, currents I_CAN_H, I_CAN_L flow mainly via parasitic drain capacitances 1253, 1263 of associated stand-off transistors 1252, 1262 to terminals 121, 122 for signals CAN_H and CAN_L. Without an operation of emission reduction unit 15, current I_CAN_H into terminal 121 for bus wire 41 for signal CAN_H during the switching operations resulting from the change between different states 111, 110 of transmit signal TxD, becomes significantly greater than current I_CAN_L, which flows into terminals 122 for bus wire 42 for signal CAN-L. This results in different currents in a decoupling network according to FIG. 3 and, as a result, in particularly excessive emission levels in the EMV certification.

In order to avoid this, emission reduction unit 15 is connected according to FIG. 2 to the gate of P-channel high-voltage stand-off transistor 1252. Emission reduction unit 15 has a logic block 151 for switching on or off a low-impedance switch 152 in the form of an N-channel transistor. Between gate and drain of N-channel transistor 152, a high-impedance resistor 153 is switchable, which is connected at its one end to the gate of P-channel high-voltage stand-off transistor 1252 and at its other end to ground. Resistor 153 may be a single resistor. Alternatively, resistor 153 is formed from at least two interconnected resistors.

Emission reduction unit 15 implements a connected stand-off device in the transmitting block. In this case, the switch-on path for N-channel high-voltage stand-off transistor 1252 is connected at low impedance or high impedance to ground, depending on the specification of logic block 151, as described below.

In the event transceiver device 12 is to implement a receiving user station in bus system 1 for user station 10, i.e., does not itself transmit, the gate of N-channel high-voltage stand-off transistor 1252 is connected to ground according to the specification of logic block 151 via high-impedance resistor 153 and therefore connected at high impedance to ground. In this way, resistor 153 is connected into switch-on path of transistor 1252 as a stand-off device. As a result, a current I_CAN_H into terminal 121 for bus signal CAN_H is drastically reduced during switching operations of the bus signal on bus 40. As a result, current I_CAN-H into terminal 121 for bus signal CAN_H is adapted in the aforementioned case to current I_CAN_L into terminal 122 for bus signal CAN_L.

In the event that transceiver device 12 in bus system 1 is to implement a transmitting user station for user station 10, and is to drive bus 40 for a dominant bus state due to a dominant state 111 of transmit signal TxD, the high-impedance gate connection would adversely affect the switch-time behavior of the bus signal. Logic block 151 therefore decides in the event of such a transmit instruction that the gate of N-channel high-voltage stand-off transistor 1252 is connected to ground with the aid of low-impedance switch 152 and is thus connected at low impedance to ground. Switch 152 is thus connected as a stand-off device into the switch-on path of transistor 1252. If transceiver device 12 should establish a recessive level both at the output of its receiving comparator 1200 in receiving stage 120 as well as at transmit signal TxD, then switch 152 remains high-impedance, so that the gate of N-channel high-voltage stand-off transistor 1252 is pulled at high impedance to ground via resistor 153 with the aid of low-impedance switch 152.

Thus, transceiver device 12 ensures that different currents I_CAN_H, I_CAN_L caused by a significantly larger P-channel stand-off device, transistor 1252, at terminal 121 for bus wire 41 as compared to an N-channel stand-off device, transistor 1262, at terminal 122 for bus wire 42, are compensated for. The P-channel stand-off device is selected to be significantly larger than the N-channel stand-off device, so that the two devices have the same resistance Rdson in the switched-on state. In this case, the effect of parasitic gate-drain capacitances 1253, 1263 is compensated for due to these device 1252, 1262 and due to reverse polarity protection diode 129, which must be interposed in the CANL path of the transmitting stage due to the requirement of the CAN specification of a maximum rating −27V.

Figure 3:
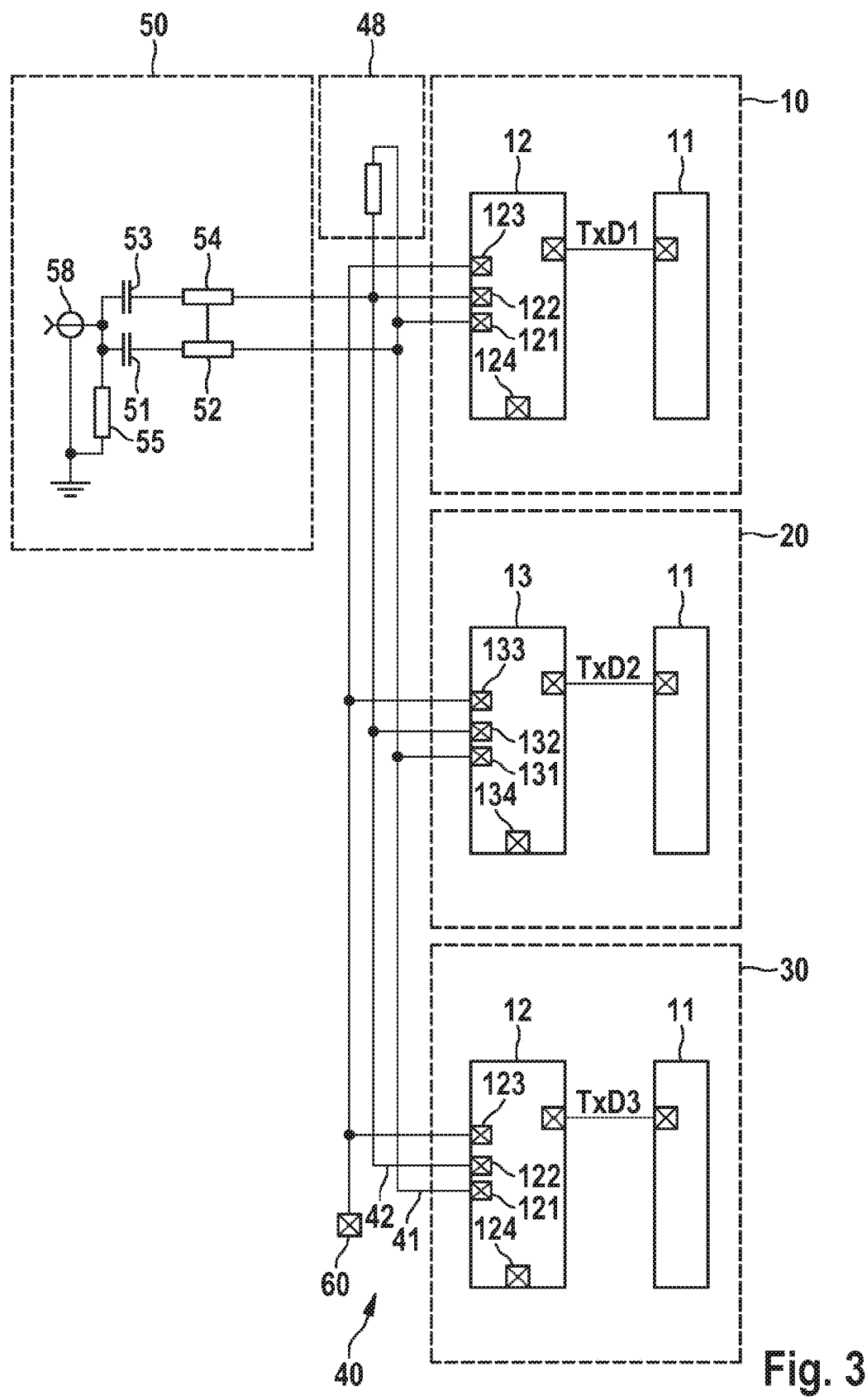
FIG. 3 shows a circuit diagram of a decoupling network for an emission measurement of a transceiver device in the bus system according to the first exemplary embodiment.

Using a decoupling network 50 according to FIG. 3 at the two bus wires 41, 42 of bus 40, it is possible to measure the emission for transceiver devices 12, 13. Decoupling network 50 has a first series connection made up of a first capacitor 51 and a first resistor 52. Resistor 52 is connected at its one end to first bus wire 41 for bus signal CAN_H. Decoupling network 50 also has a second series connection made up of a second capacitor 53 and a second resistor 54. Resistor 54 is connected at its other end to second bus wire 42 for bus signal CAN L. First and second capacitor 51, 53 are each connected at their other end to a resistor 55, which is connected at its other end to ground. A voltage meter 58 is connected in parallel to resistor 55.

As shown in FIG. 3, bus 40 is terminated with resistor 48 between the two bus wires 41, 42. A voltage V_CAN_Supply for transceiver devices 12, 13 is fed from a terminal 60.

Transceiver devices 12 of user stations 10, 30 are each connected to bus wires 41 at terminal 121. Transceiver devices 12 are also each connected to bus wire 42 at terminal 122. Terminals 123, 124 of transceiver device 12 are engaged as described above with reference to FIG. 2.

Similarly, transceiver device 13 of user station 20 is connected to bus wire 41 at a terminal 131. Transceiver device 13 is also connected to bus wire 42 at a terminal 132. Voltage V_CAN_Supply for transceiver device 13 is fed at a terminal 133. Transceiver device 12 is connected to the ground of bus system 1, in particular, CAN_GND, at a terminal 134.

The structure shown in FIG. 3 and described above corresponds to the structure that is codified for the EMV measurement in the document "IEC TS 62228 Integrated circuits—EMC evaluation of CAN transceivers." Thus, three transceiver devices 12, 13 are operated at the same CAN bus 40 having a shared terminating resistor 48 with a resistance value of 60 ohms and with decoupling network 50. One of the transceiver devices 12 transmits, controlled via a transmit signal TxD1, the other transceiver devices 12, 13 are in the same operating mode, but transmit no dominant bit or no dominant signal state, so that their respective transmit signals TxD2, TxD3 are high=recessive. FIG. 3 shows a specific example thereof.

Reduced current I_CAN_H, which is aligned to lower current I-CAN_L into the bus pins or terminals 121, 122, 131, 132 of the two receiving transceiver devices 12, 13, is caused by respective emission reduction unit 15 in transceiver devices 12, as described above with reference to transceiver device 12.

Figure 4:
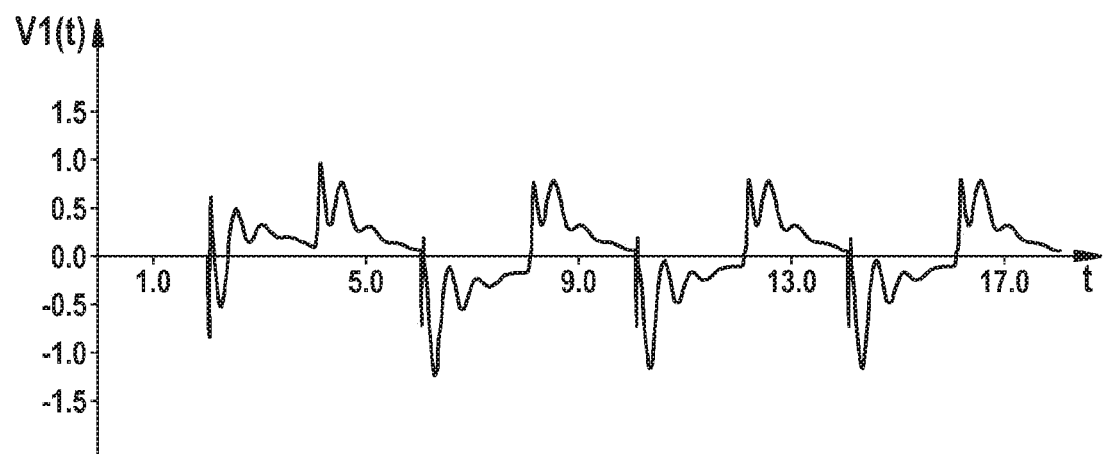
FIG. 4 shows a temporal profile of a transient decoupling signal for emission in a first transceiver device according to the first exemplary embodiment.
Figure 5:
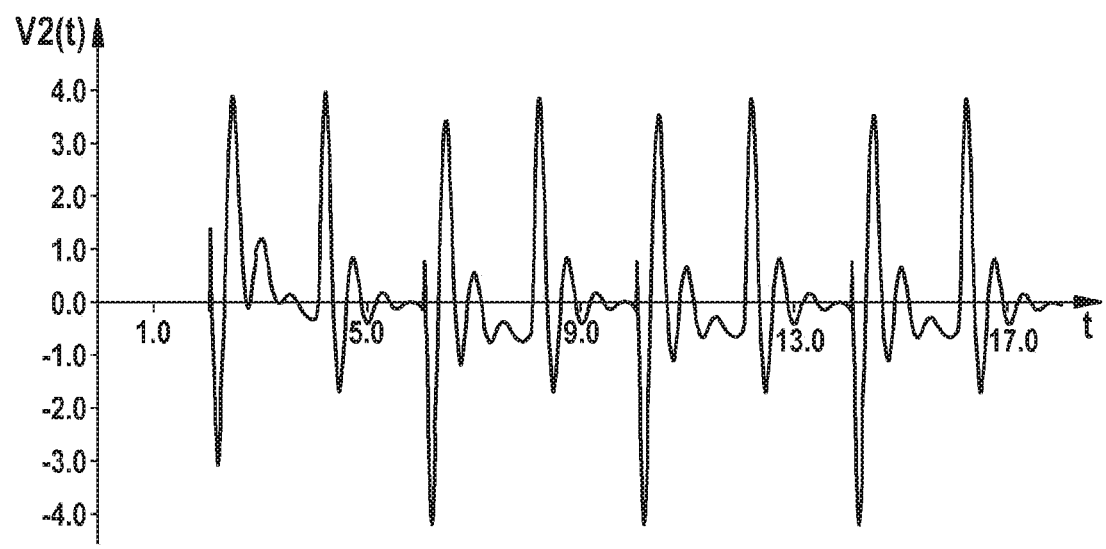
FIG. 5 shows a temporal profile of a transient decoupling signal for emission in a second transceiver device according to the first exemplary embodiment.

The resulting emission with respect to transceiver device 12 is shown in FIG. 4 as a function of the transient decoupling voltage V1(t) over time t. Also depicted in FIG. 5 by way of comparison is the transient decoupling voltage V2(t) over time t for transceiver device 13, which includes no emission reduction unit 15. The signal profile according to FIG. 5 exhibits high amplitudes in the range of the resonance frequency of a common mode choke. In contrast, the signal profile according to FIG. 4 shows significantly reduced amplitudes, namely, amplitudes reduced by the factor 3 to 4.

Thus, it is possible with emission reduction unit 15 in transceiver device 12 to clearly align currents I_CAN_H, I_CAN_L into terminals 121, 122 in decoupling network 50. As a result, the emission of the two transceiver devices 12 according to FIG. 4 is significantly less than the emission of transceiver device 13 according to FIG. 5. Thus, in the EMV certification and also during subsequent operation, the particularly excessive emission levels measurable in transceiver device 13 according to FIG. 5 do not occur for transceiver device 12.

Figure 6:
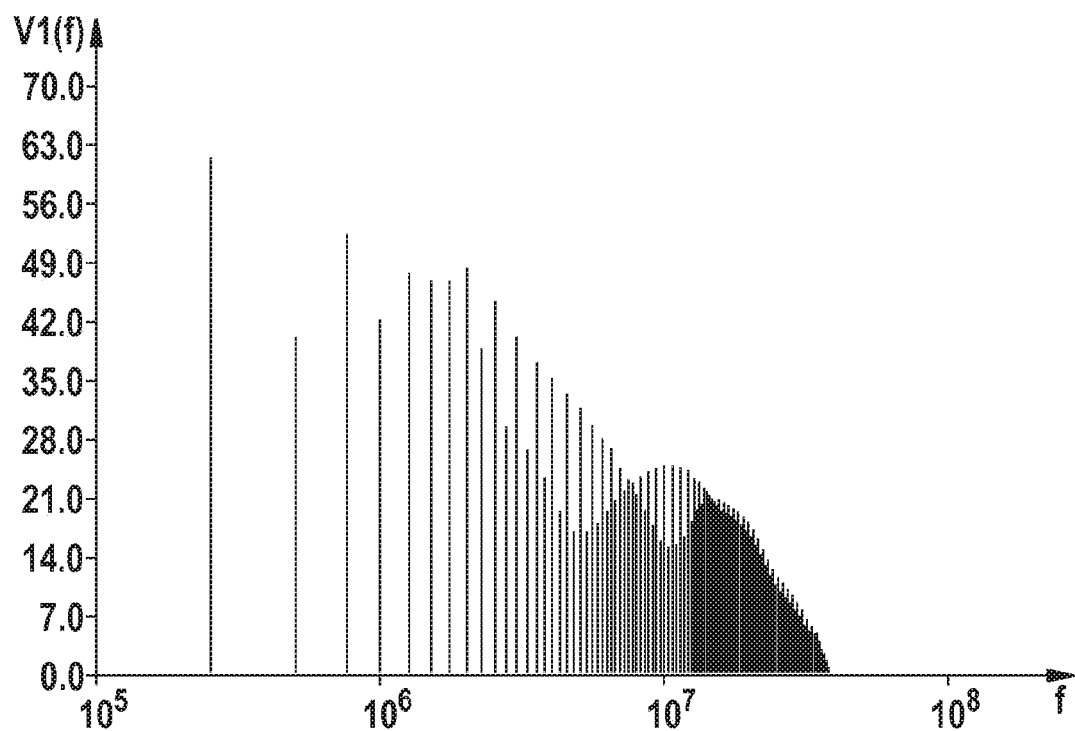
FIG. 6 shows a frequency spectrum in the first transceiver device according to the first exemplary embodiment.
Figure 7:
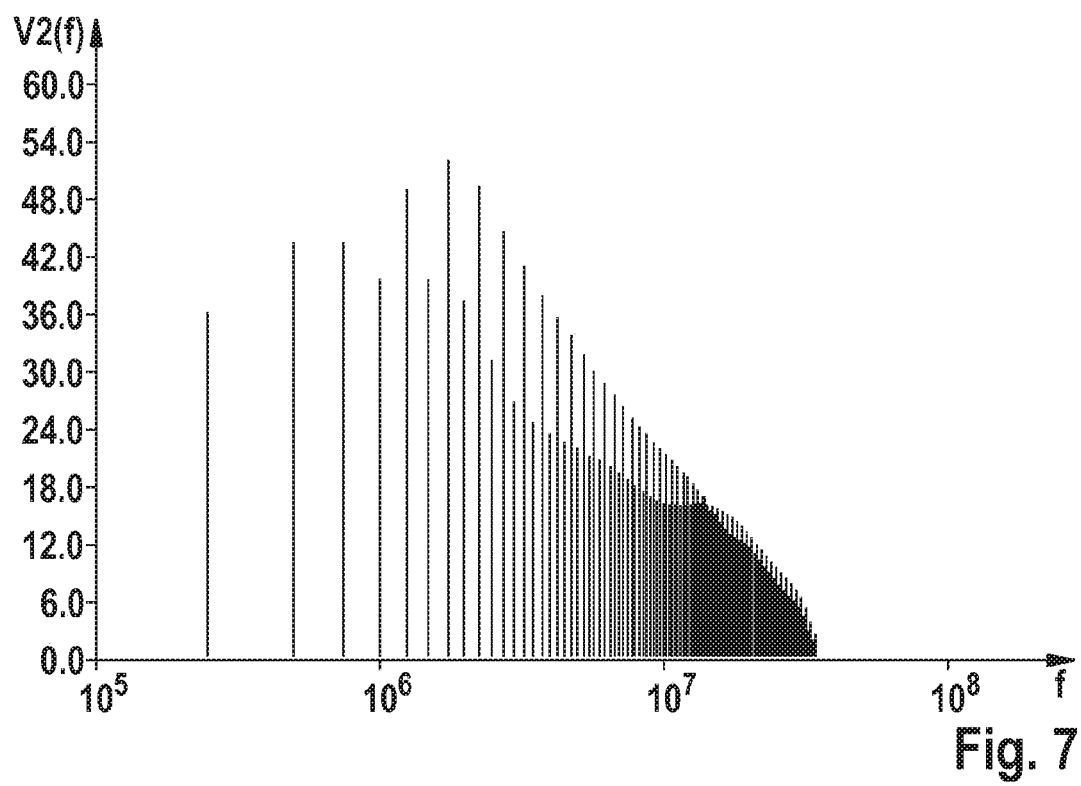
FIG. 7 shows a frequency spectrum in the second transceiver device according to the first exemplary embodiment.

The effects on the frequency spectrum are depicted in FIG. 6 for respective transceiver devices 12 and in FIG. 7 for transceiver device 13. According to FIG. 7, the requirement of 55 dBμV in the range of 750 kHz to 10 MHz for transceiver device 13 is severely violated. By comparison, the requirement may be fulfilled using respective transceiver devices 12, as is apparent from FIG. 6.

Thus, a method for reducing conducted emissions is carried out with transceiver device 12 with the aid of emission reduction unit 15.

According to a second exemplary embodiment, the size of N-channel high-voltage stand-off transistor 1252 may be reduced, which reduces coupling capacity 1253. This is strongly limited due to the power loss consideration in the event of a short circuit to, for example, the battery of a vehicle at bus 40. In addition, the CMOS part (CMOS=complementary metal-oxide semiconductor) of the N-channel high-voltage stand-off transistor 1252 must therefore be enlarged to adhere to the transmission level tolerance.

All of the above-described embodiments of emission reduction unit 15 of transceiver devices 12, of user stations 10, 30 of bus system 1 and of the method carried out therein according to the first and second exemplary embodiments may be used individually or in all possible combinations. The following modifications, in particular, are possible.

The above-described bus system 1 according to the first and second exemplary embodiments is described with reference to a bus system based on the CAN protocol. Bus system 1 according to the first and/or second exemplary embodiment may, however, also be another type of communication network. It is advantageous, though not a mandatory precondition, that an exclusive, collision-free access of a user station 10, 20, 30 to bus 40 or to a shared channel of bus 40 is at least temporarily ensured in bus system 1.

Bus system 1 according to the first and/or second exemplary embodiment and their modifications is, in particular, a CAN network or a CAN HS network or a CAN FD network or a FlexRay network. Bus system 1 may, however, also be a different serial communication network.

The number and arrangement of user stations 10, 20, 30 in bus system 1 according to the first and second exemplary embodiments and their modifications, is arbitrary. Only user stations 10 or user stations 20 or user stations 30, in particular, may only be present in bus systems 1 of the first or second exemplary embodiments. Regardless thereof, only emission reduction units 15 may be present, which are designed according to one of the above-described embodiment variants.

The functionality of the above-described exemplary embodiments may be implemented in a transceiver or a transceiver device 12, 13 or transceiver or a CAN transceiver or a transceiver chipset or a CAN transceiver chipset, etc. In addition or alternatively, it may be integrated into existing products. It is possible, in particular, that the considered functionality is implemented either in the transceiver as a separate electronic component (chip) or is embedded in an integrated overall approach, in which only one electronic component (chip) is present.

What is claimed is:

1. A transceiver device for a bus system, comprising:
   a transmitting stage to transmit a transmit signal to a first bus wire of a bus of the bus system, wherein in the bus system, an exclusive, collision-free access of a user station to the bus of the bus system is at least temporarily ensured, and configured to transmit the transmit signal to a second bus wire of the bus;
   a receiving stage to receive a bus signal transmitted on the bus wires; and an emission reduction unit to control a switch-on path of a first stand-off device in the transmitting stage as a function of whether or not a dominant state of the transmit signal occurs;

wherein the emission reduction unit includes:
a logic block to evaluate the transmit signal and a signal received by the bus;
a resistor which is connected at one end to a gate of the stand-off device and at its other end to ground; and
a switch to switch the gate of the stand-off device as a function of an evaluation result of the logic block.

2. The transceiver device as recited in claim 1, wherein first stand-off device includes a P-channel stand-off device, and wherein the emission reduction unit is configured to control an effective resistance to ground for the switch-on path of the P-channel stand-off device.

3. The transceiver device as recited in claim 1, wherein the transmitting stage includes a first transmitting block configured to transmit the transmit signal to the first bus wire and a second transmitting block configured to transmit the transmit signal to the second bus wire, and wherein the first stand-off device is connected into the first transmitting block.

4. The transceiver device as recited in claim 1, wherein the first stand-off device includes a P-channel stand-off transistor, and the emission reduction unit is configured to control a gate of the P-channel stand-off transistor.

5. The transceiver device as recited in claim 3, wherein the second transmitting block includes a second stand-off device which is smaller than the first stand-off device which is provided in the first transmitting block.

6. The transceiver device as recited in claim 5, wherein the second stand-off device includes an N-channel stand-off transistor.

7. The transceiver device as recited in claim 1, wherein the switch is configured to switch the gate of the stand-off device as a function of the evaluation result of the logic block so that the gate of the stand-off device is either pulled at low impedance to ground using the switch or is pulled at high impedance to ground via the resistor.

8. The transceiver device as recited in claim 7, wherein the logic block is configured to activate the switch to pull the switch-on path of the stand-off device at low impedance to ground if a dominant state of the transmit signal occurs, and the logic block is configured to activate the switch to pull the switch-on path of the stand-off device at high impedance to ground if a recessive state of the transmit signal occurs and the transceiver device is operated for receiving.

9. The transceiver device as recited in claim 1, wherein the switch includes a transistor, which has a lower-impedance resistance value than the resistor, and an output of the logic block is connected to the gate of the transistor.

10. The transceiver device as recited in claim 1, wherein the transceiver device includes a CAN FD transceiver device.

11. A bus system, comprising:
a bus; and
at least two user stations,. which are interconnected via the bus so that they are able to communicate with one another, wherein at least one of the at least two user stations includes a transceiver device including:
a transmitting stage to transmit a transmit signal to a first bus wire of a bus of the bus system, wherein in the bus system, an exclusive, collision-free access of a user station to the bus of the bus system is at least temporarily ensured, and to transmit the transmit signal to a second bus wire of the bus;
a receiving stage to receive a bus signal transmitted on the bus wires; and
an emission reduction unit to control a switch-on path of a first stand-off device in the transmitting stage as a function of whether or not a dominant state of the transmit signal occurs;
wherein the emission reduction unit includes:
a logic block to evaluate the transmit signal and a signal received by the bus;
a resistor which is connected at one end to a gate of the stand-off device and at its other end to ground; and
a switch to switch the gate of the stand-off device as a function of an evaluation result of the logic block.

12. A method for reducing conducted emissions carried out using a transceiver device for a bus system, the method comprising following steps:
transmitting, using a transmitting stage, a transmit signal to a first bus wire of a bus of the bus system, in which an exclusive, collision-free access of a user station to the bus of the bus system is at least temporarily ensured, the transceiver device including the transmitting stage, a receiving stage, and an emission reduction unit;
transmitting the transmit signal to a second bus wire of the bus;
receiving, using the receiving stage, a bus signal transmitted on the bus wires; and
controlling, using the emission reduction unit, a switch-on path of a first stand-off device in the transmitting stage as a function of whether a dominant state of the transmit signal occurs;
wherein the emission reduction unit includes:
a logic block to evaluate the transmit signal and a signal received by the bus;
a resistor which is connected at one end to a gate of the stand-off device and at its other end to ground; and
a switch to switch the gate of the stand-off device as a function of an evaluation result of the logic block.

13. The method as recited in claim 12, wherein the switch is configured to switch the gate of the stand-off device as a function of the evaluation result of the logic block so that the gate of the stand-off device is either pulled at low impedance to ground using the switch or is pulled at high impedance to ground via the resistor.

14. The method as recited in claim 13, wherein the switch includes a transistor, which has a lower-impedance resistance value than the resistor, and an output of the logic block is connected to the gate of the transistor.

15. The bus system as recited in claim 11, wherein the switch is configured to switch the gate of the stand-off device as a function of the evaluation result of the logic block so that the gate of the stand-off device is either pulled at low impedance to ground using the switch or is pulled at high impedance to ground via the resistor.

16. The bus system as recited in claim 15, wherein the switch includes a transistor, which has a lower-impedance resistance value than the resistor, and an output of the logic block is connected to the gate of the transistor.

* * * * *